July 13, 1943.  P. BURGESS  2,324,133
LIGHT CONTROL MEANS
Filed May 22, 1940   8 Sheets-Sheet 1

INVENTOR,
Paul Burgess;
BY

July 13, 1943.  P. BURGESS  2,324,133
LIGHT CONTROL MEANS
Filed May 22, 1940    8 Sheets-Sheet 2

INVENTOR,
Paul Burgess;
BY

July 13, 1943.                P. BURGESS                2,324,133
                            LIGHT CONTROL MEANS
                  Filed May 22, 1940              8 Sheets-Sheet 4

INVENTOR,
Paul Burgess;
BY

INVENTOR,
Paul Burgess;
BY

Patented July 13, 1943

2,324,133

UNITED STATES PATENT OFFICE 2,324,133

LIGHT CONTROL MEANS

Paul Burgess, Los Angeles, Calif.

Application May 22, 1940, Serial No. 336,557

5 Claims. (Cl. 88—57)

This invention relates to light control means for use with lenses of any type.

A certain amount of light passed through a camera lens, by way of example, is scattered at each refraction. Not all of this light is image bearing, although some of it may be. The amount of light lost by scattering is far more detrimental to the production of brilliant images than subtraction of the corresponding amount of light from the incident beam would indicate, for some of the scattered light from intensely illuminated objects will fall upon parts of the image corresponding to dark objects, with the result that a flattening in the tones of the image takes place. This scattered light effects the sensitive emulsion of a film so as to fog any photographic image thereon. For convenience of discussion and based upon experiments that I have conducted, scattered light may be classified as of four general forms:

1. Light which enters the lens from outside its field or angle of vision and thus cannot be brought to an image focus within the confines of the negative dimensions;

2. Light rays which enter the front surface of the lens system, both from within and without the lens field, at incident angles of 90° and have had one less refraction than all other rays;

3. Ultra-violet light, which cannot be brought to a punctual focus at the image plane, owing to its refrangibility being greater than the rays of the visible spectrum;

4. The cone of light within a camera when the light source is of high intensity or contains a point or points of intense illumination.

To reduce the interference or damage from these forms of scattered light, it is the present practice to use color filters, polarizing screens, or reduction of the lens aperture by means of a diaphragm. Each means may be used alone or in combination with the others.

It is undenied that scattered light is transmitted into a camera by a lens, and it follows that a lens transmits scattered light when used to refract image rays. In the description hereinafter set forth of my invention, in its several adaptations, I have found it more accurate and expedient to term the scattering of light by a lens as "window capacity," which is the ability of the lens to pass non-image forming light as a window passes light.

I have found that the ability of a lens to refract image light and window capacity of light is not constant, but that the ratio therebetween varies in proportion to the illuminating strength of the light source, and also differs with the lens aperture in relation to the focal length thereof.

An object of the present invention is the provision of means whereby the entire useful aperture of any lens may be used under all conditions of light strength, with image detail remaining normally brilliant.

Another object of the invention is the substantial elimination of all scattered light.

Another object of the invention is the provision of means whereby ultra-violet light rays are prevented from becoming sources of scattered light when image light refraction is undertaken.

Another object is the provision in a single lens or lens system of means whereby said single lens or lens system may be caused to function and operate as two separate but identical lenses or lens system.

Another object is the provision of means whereby two separate images may be produced from two different angles; for instance, in the embodiment of the invention hereinafter described, I may have a 12° difference in the images utilizing an f2.7 lens at full aperture and 4° when using an f8 lens at full aperture.

Another object is the provision in a single lens or lens system whereby all light rays other than those actually required and used for registration of the optical image, are rejected.

Another object is the provision in a device of the character stated of means whereby two nearly identical exposures on one film may be made from two adjacent lens positions by a single lens.

Another object is the provision of means whereby proper color balance of the image may be maintained when colored image rays are refracted to produce colored images, such as in color photography and television.

Other objects of the invention consist of devices as hereinafter described, which are simple in construction, inexpensive in cost of manufacture, and capable of producing superior results for the purpose intended.

With the above mentioned and other objects in view, the invention consists in the novel and useful provision, formation, construction, association, and arrangement of parts, members, and features, as well as the method of using said parts, members, and features, all as hereinafter described generally, and more specifically set forth in the claims.

Referring specifically to Figures 1 to 5, inclusive, I have illustrated one embodiment of my invention, it being understood that the invention is to be incorporated in any instrumentality where a lens is used and it is desired to produce a normally brilliant image on a screen, photo-electric cell, film emulsion, scanning disc, or other object. Accordingly, in the carrying out of my invention and for the purpose of illustration only, I have shown in the figures mentioned a camera housing 1. As is usual, the camera housing is adapted to have placed therein a film 2, this film to receive an image bearing light beam. In order that the image bearing light beam be properly focused, a lens or objective of some character must be utilized, such as, for instance, illustrated at 3. In the illustration, the lens depicted is the well known Tessar f2.7. As is customary in the art, the lenses are placed in a suitable mounting 4. By the provision of any suitable means, such as shown at 5, the objective is secured to the housing front of the camera. This front is provided with the usual opening 6 for in part receiving the said objective. I claim no particular objective or means for securing the objective to the housing, as any means may be utilized. Furthermore, a suitable focusing mount may be provided for the objective.

Adapted to be interposed between the objective and the film 2 is means 7 constituting one embodiment of the invention. The means 7 includes a pair of curved side walls 8 and 9 provided with top and base members 10 and 11, the curved walls terminating adjacent the opening 6 and likewise terminating inward from the camera front to provide a substantially rectangular opening or slot 12. The width of the opening 12 is such as to permit both light tunnels to transmit all image bearing light beams from their respective lens halves. A second member, designated as an entirety by 13, is provided with a curved side wall 14 and top and base members 15 and 16, respectively. The member 13 is mounted so as to be rotatable relative to the member 7, and upon reference to Figure 2, it will be seen that suitable means, such as pivots 17 and 18, are provided for this purpose. These particular pivots are passed through the camera housing and through openings in the top and base members of said members 7 and 13.

Figure 1:
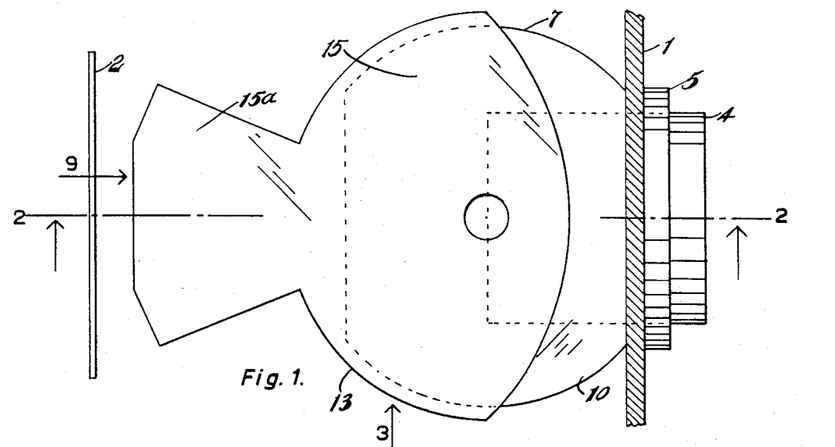
Figure 1 is a plan view of one embodiment of my invention showing a swing type tunnel member, a portion of a housing, in section, for holding said tunnel member and a lens; and a film rearward of the tunnel member.
Figure 2:
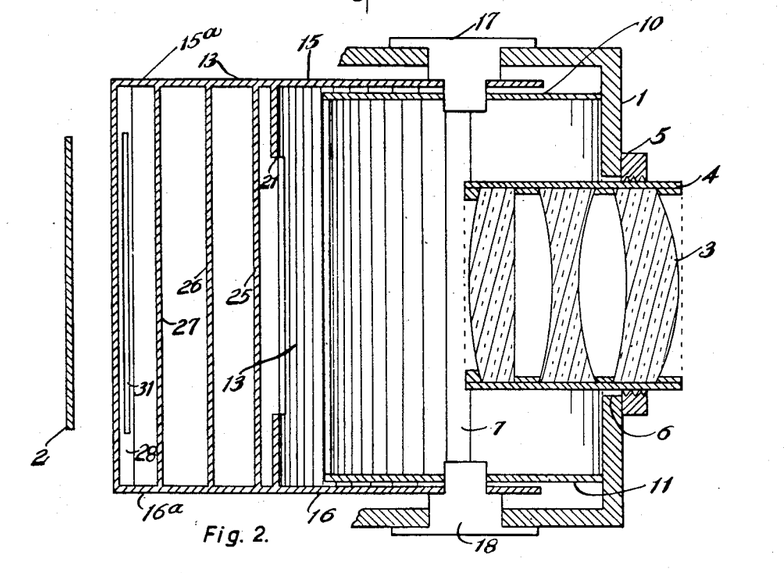
Figure 2 is a sectional view on the line 2—2 of Figure 1.
Figure 3:
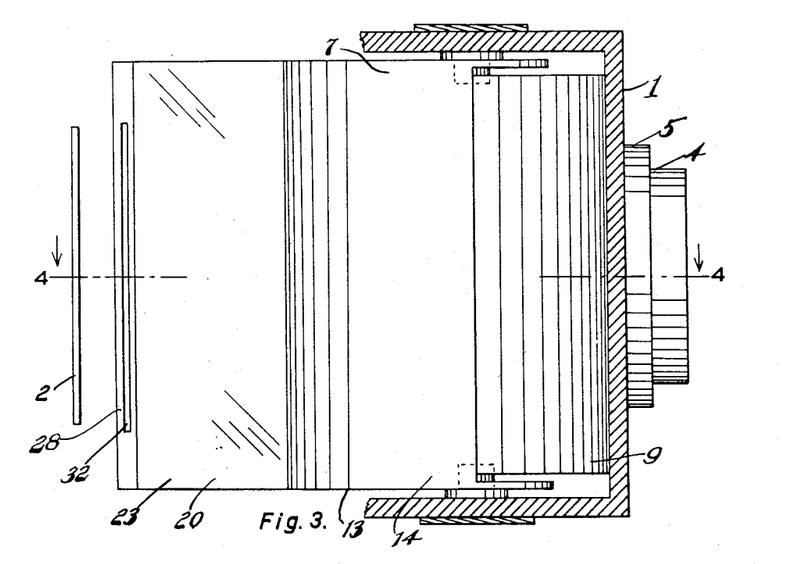
Figure 3 is a view looking in the direction of the arrow 3 of Figure 1.
Figure 4:
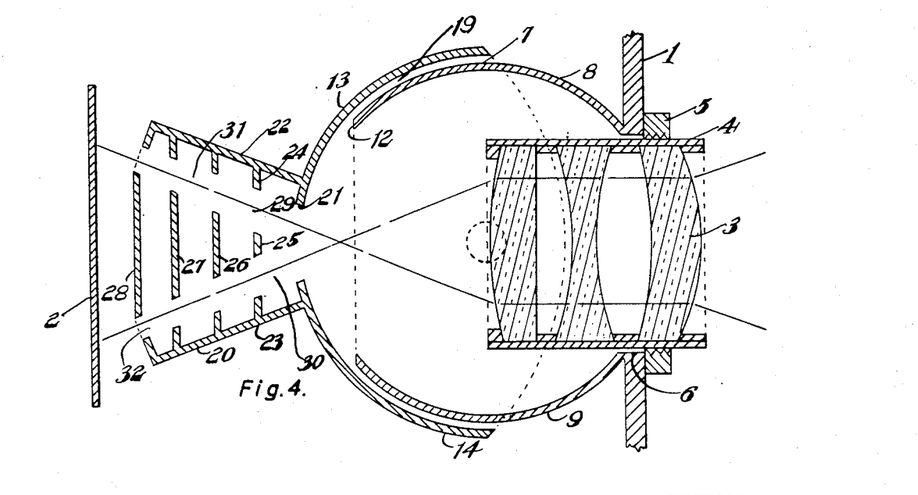
Figure 4 is a sectional view on the line 4—4 of Figure 3.
Figure 5:
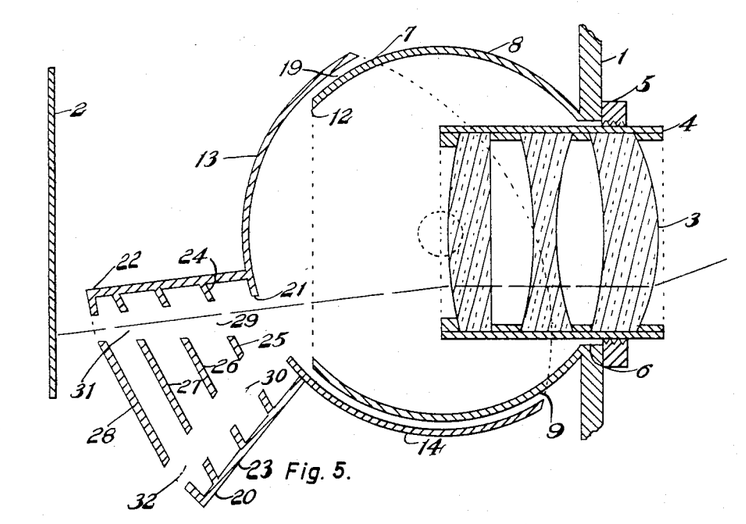
Figure 5 is a sectional view similar to Figure 4, the tunnel member in a changed position.
Figure 9:
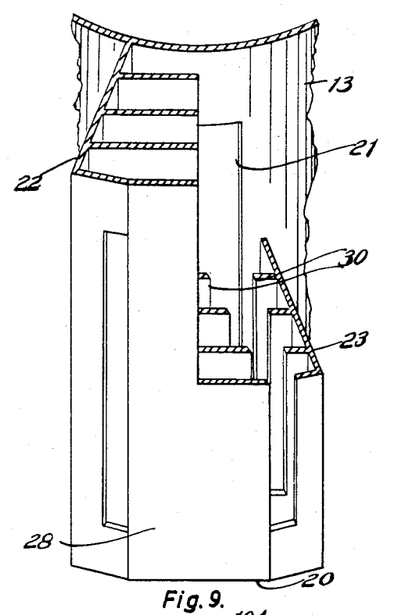
Figure 9 is a fragmentary perspective view, certain parts being in section, and showing the interior construction of one of the tunnel members of the invention, said view looking in the direction of the arrow 9 of Figure 1.

It is to be observed that the member 13 is a section of a hollow cylinder with the top and base members so proportioned as to best give stability and strength to the structure when secured to the member 7 by the pivots. Furthermore, the members 7 and 13 are concentric so that limited rotation of the member 13 may be effected relative to the member 7. In all instances, there will be an overlapping between the two side walls and at the excursion of greatest movement of the member 13. By way of example, in Figure 5, it is evident that the member 13 may be rotated anti-clockwise with the members 7 and 13 still in overlapped relationship at the zone 19. The member 13 incorporates a light tunnel member designated generally as 20. Figure 9 illustrates this member 20 in perspective, and wherein it will be seen that said member projects from the periphery of said member 13 and in the zone of a rectangular slot 21 in said member. The light tunnel member, in the embodiment shown, includes a pair of spaced-apart, substantially radial, side walls 22 and 23, with top and base members forming a continuation of the top and base members of the member 13 (see Figure 1) and designated as 15ᵃ and 16ᵃ. Included between the top, base and side walls of member 20 are one or more substantially parallel and, in the drawing, equally spaced-apart partitions designated as an entirety by 24. In Figure 5, I have provided a plurality of partitions, as shown at 25, 26, 27 and 28. The last partition constitutes the outer wall. Each of these partitions is rectangularly slotted at 29 and 30. The slots progressively vary in width, in the present instance, as shown, each partition portion extending between the boundary line of a slot and a side wall is of equal width, whereas that portion of each partition intermediate the slots 29 and 30 progressively varies in width from the innermost partition 25 to the wall 28. The slotted arrangement provides separate light tunnels 31 and 32.

The focal length and lens diameter determine the progressively varying width of the light tunnels. To-wit, at full aperture, substantially a half section of refracted image bearing light beam is passed through a tunnel as the tunnel member traverses an arc of movement.

Figures 12, 13:
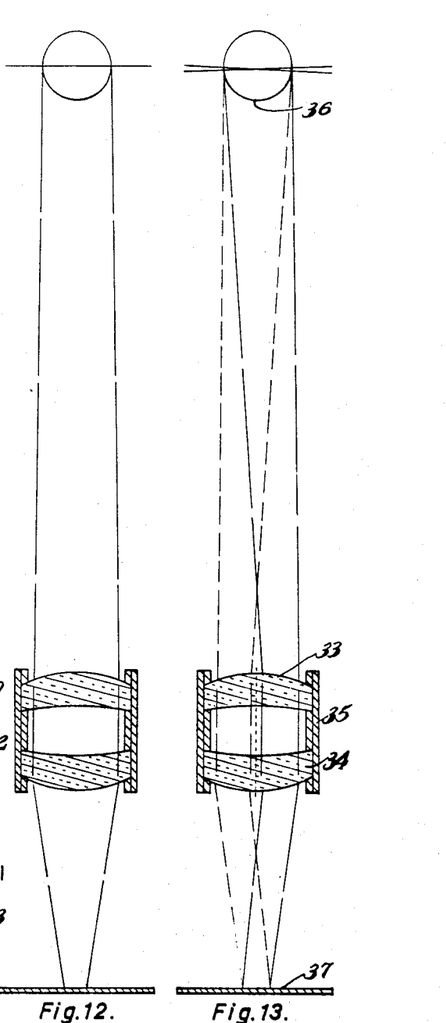
Figure 12 is illustrative of the passage of image bearing light rays from an object through an objective onto a film.
Figure 13 illustrates the result of bisecting the objective with image bearing light rays from an object to obtain effects desired by the invention.
Figures 14, 15, 16:
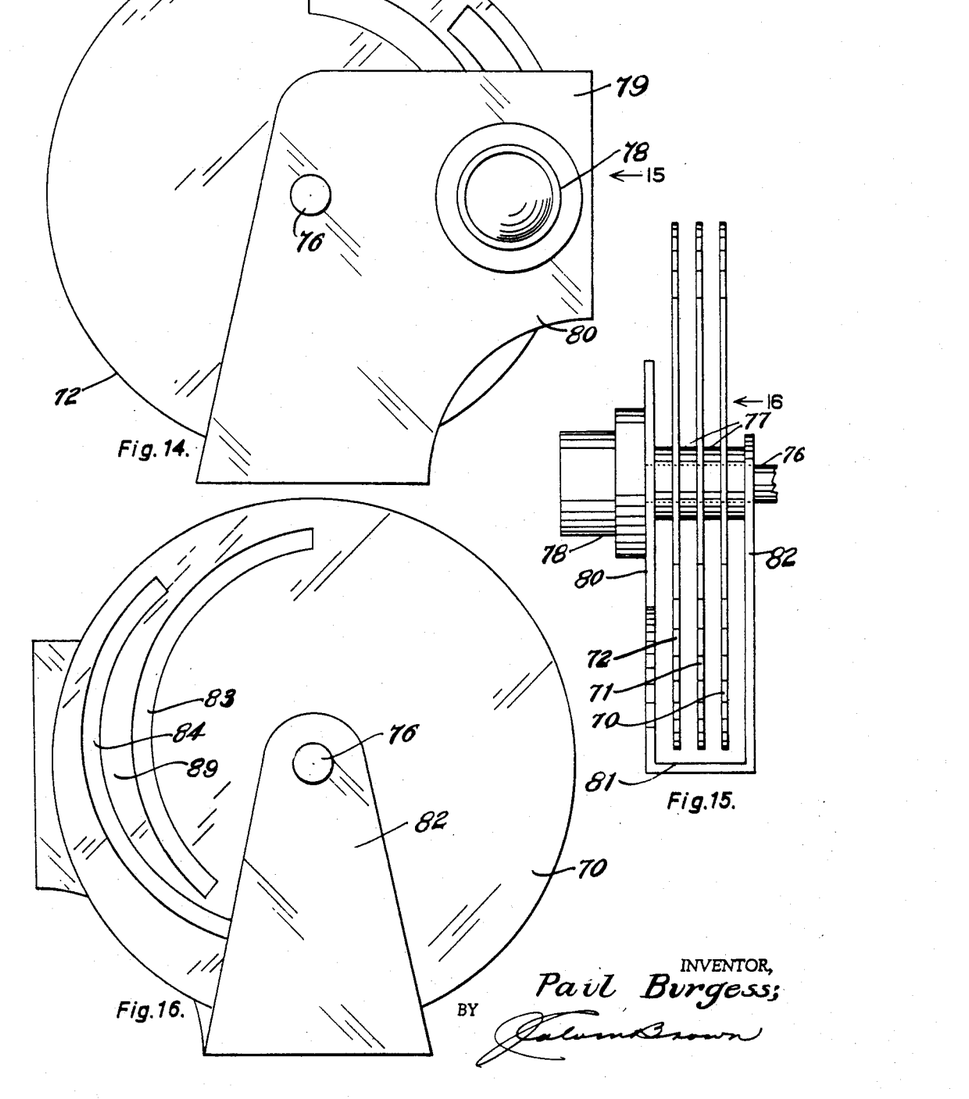
Figure 14 is an elevation of a modified form of the invention for use with motion picture cameras.
Figure 15 is a view looking in the direction of the arrow 15 of Figure 14.
Figure 16 is a view looking in the direction of the arrow 16 of Figure 15.

Referring to Figure 13, I have shown a rapid rectilinear cell comprising the usual pair of convex-concavo lenses 33 and 34 held by a suitable mount 35, the concave surfaces facing each other and wherein I have illustrated at 36 an object. It will be seen that image-bearing light rays from the object are refracted by the objective, said rays finally striking the film or screen 37. The condition is such, however, that the optical center of the objective is not utilized, with the result that I accomplish with one objective the equivalent of providing two objectives. In other words, the objective is subdivided along its optical axis and this subdivision eliminates the central 90° incident ray. Hence, the objective receives image bearing light rays from the object 36 in the manner indicated by the dotted lines. In Figure 12, I have illustrated the ordinary type of rectilinear lens without any subdivision of the light rays. To those skilled in the art of optics, it must be readily realized that it is quite impossible, even under the finest of working conditions, to provide two duplicate lenses having like characteristics, and capable of producing the same image in an overlapping manner when used at varying focal distances. Hence, it would be quite impossible to take and split a lens into two halves and have said halves function in an identical manner. However, with my present invention, I achieve the result of splitting the lens vertically through its optical axis to get two independent image bearing light beams, one from each lens half, and each covering the complete image field. Whatever discrepancy there may be in the lens construction does not affect the results to be obtained by me in the practice of my invention.

In utilizing the tunnel arrangement which I have disclosed in Figures 1 to 5, inclusive, it is evident that all image bearing rays initially refracted or bent at the front surface of the objective are passed sequentially through the light tunnels 31 and 32 from substantially each half of a lens cell, all other rays being rejected.

Figure 6:
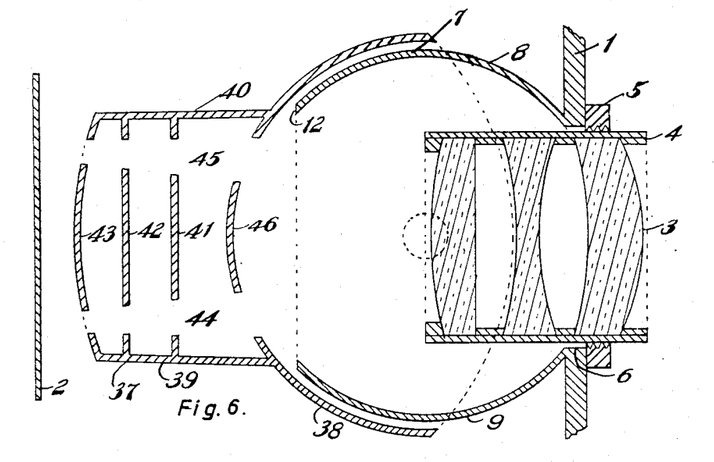
Figure 6 is a transverse sectional view of a modified form of the invention.

In Figure 6, I have shown a slightly modified form of the invention, wherein I have varied the contour of the light tunnel member, here designated as 37. This light tunnel member forms an outward projection from a hollow semi-cylindrical body 38. The other parts are given the same notation as appears on Figures 1 to 5, inclusive. In the case of the tunnel member 37, the side walls 39 and 40 are substantially parallel, and hence not radial with respect to the center of rotation of the tunnel member. As before, the tunnel member includes partitions 41, 42, and 43. The partitions are interrupted to provide the light tunnels 44 and 45. The interrupted portions of the member 38 form a partition at 46. It will be seen that there is a constantly differing space width between the interrupted walls bounding the light tunnels 44 and 45. The partition 43 is in reality the rear wall interposed between the side walls 39 and 40. The light tunnels depicted in Figure 6 operate upon the same principle as that form shown in Figures 1 to 5.

Figure 7:
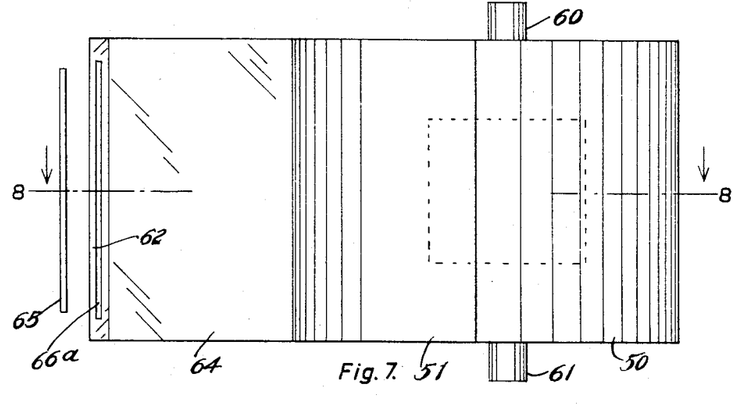
Figure 7 is a side elevation of a further modified form of the invention.
Figure 8:
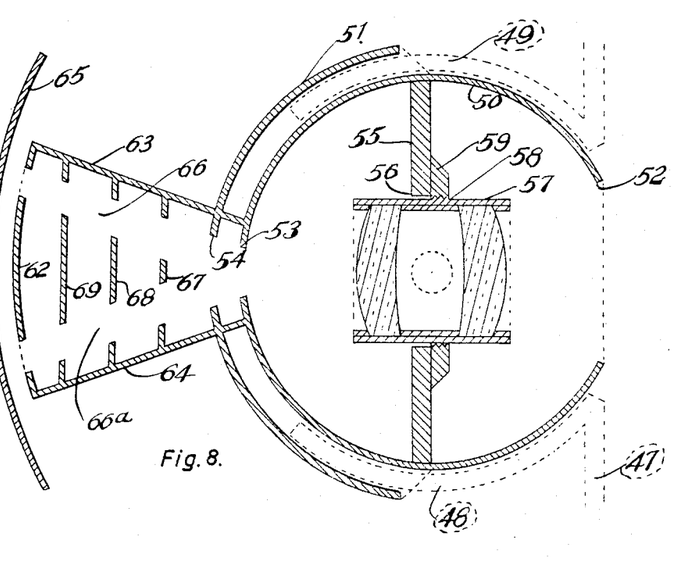
Figure 8 is a sectional view on the line 8—8 of Figure 7.

Referring to Figures 7 and 8, I have shown a further modified form of the invention wherein the lens members, together with the light tunnel member, are so related that the lens and the light tunnel member move in unison. Such an arrangement is of value where the invention is utilized with so-called panorama or circuit cameras. A camera housing shown in dotted lines at 47 is provided inwardly with two spaced-apart, curved walls 48 and 49. A pair of spaced apart curved members 50 and 51 are adapted to receive therebetween the curved walls 48 and 49. The curved wall 50 is interrupted at 52 and 53 to provide two diametrically disposed, longitudinally extended slots. The slot 52 is of greater width than the slot 53. The curved wall 51 is also interrupted at 54 to provide a longitudinal slot and the slots 53 and 54 are in alignment although the slot 54 is of greater width than the slot 53. A diametrically disposed webbing 55 is secured within the member 50 and said webbing is formed with an opening 56 adapted to receive and hold an objective 57. The mount 58 of the objective is secured to a member 59, which in turn is secured to the webbing 55. As shown in the drawings, the lens of the objective is of the rapid rectilinear f.8 type. Top and bottom members are provided for the curved walls 50 and 51, and top and bottom trunnions 60 and 61 are adapted to be received in suitable bushings of the camera housing so that the tunnel member, to be described, plus the curved side walls 50 and 51, may be rotated relative to the curved side walls 48 and 49 of the camera housing. It will be noted that the axis of the trunnions is intermediate the two objectives.

The tunnel member is of the type shown in Figures 1 to 5, with the exception that the rear wall 62 joining the radial side walls 63 and 64 of the tunnel member is curved to conform to the curvature of the film 65. The tunnel member is provided with two light tunnels 66 and 66ª, there being provided within the tunnel member spaced-apart substantially parallel partitions 67, 68 and 69, slotted to provide the light tunnels aforesaid.

Figures 17, 18:
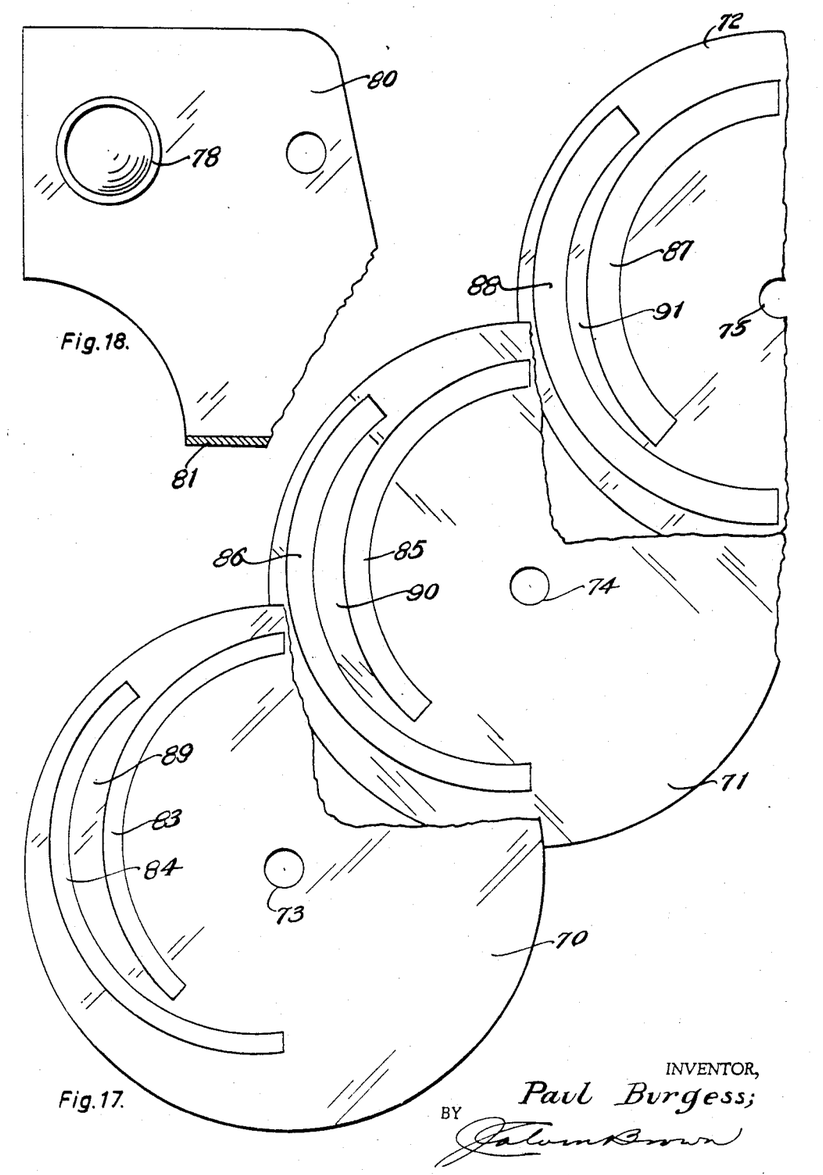
Figure 17 is a fragmentary separated view of three members which constitute the assembled members of that form of the invention illustrated in Figures 14 to 16, inclusive.
Figure 18 is a fragmentary and sectional view of a portion of a casing member, which may be utilized for holding the discs of that form of the invention illustrated in Figures 14 to 17, inclusive, and, Figures 19 to 23, inclusive, show the path of movement of image-bearing light rays through that form of the invention illustrated in Figures 14 to 17, inclusive.
Figure 19:
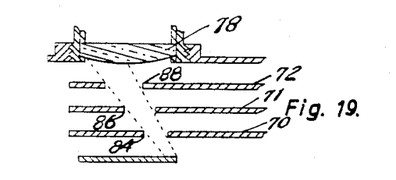
Figure 20:
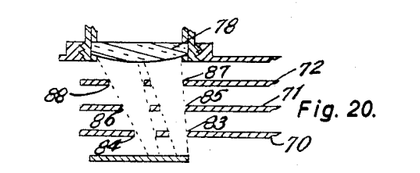
Figure 21:
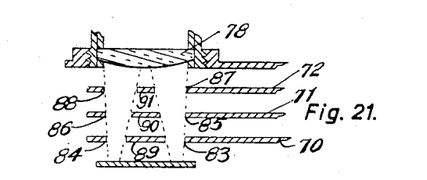
Figure 22:
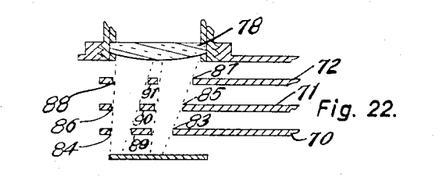
Figure 23:
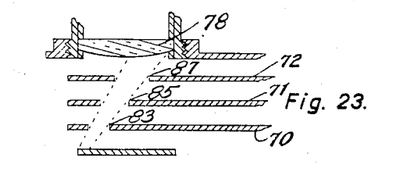

Referring now to Figures 14 to 18, inclusive, I have shown a form of device which is adaptable for motion picture cameras and which device embodies the principle of the invention. Referring first to Figure 17, I have shown in separated relationship three discs 70, 71 and 72. These discs are provided with central bores 73, 74 and 75, whereby the same may be mounted upon a shaft 76, the said discs being separated by spacers designated generally as 77, which spacers are carried on the shaft. The spacers tightly grip the discs so that the discs will all revolve together when the shaft is rotated. For convenience, I have shown a portion of a camera housing including an objective 78, carried in a casting 79, said casting having a front wall 80, a bottom wall 81 and a rear wall 82 spaced from the front wall and substantially parallel therewith. The spacers together with the discs are mounted between the walls 80 and 82, and the objective is positioned to one side of the axis of said discs. The discs 70, 71 and 72 are respectively provided with spaced pairs of eccentric spiral slots 83 and 84; 85 and 86; 87 and 88. These slots progressively vary in width from disc 70 to disc 72. The portions 89, 90 and 91, which lie between the slots of the respective discs 70 to 72, respectively, function in the same manner as the partitions in the light tunnel members depicted in Figures 1 to 8, inclusive. This is best illustrated in Figures 19 to 23, wherein the path of image bearing light rays through the light tunnels is shown as the discs are revolved simultaneously. The solid segmental portion of the discs acts as a shutter to cover the film during film movement.

Figure 10:
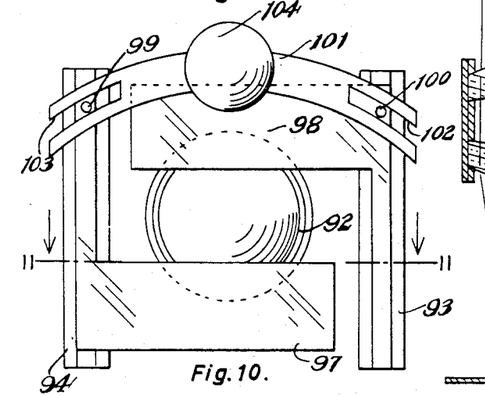
Figure 10 is an elevation of a diaphragm member which may be utilized in conjunction with a lens in practicing the invention in its several forms.
Figure 11:
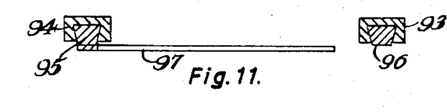
Figure 11 is a sectional view on the line 11—11 of Figure 10.

In certain instances, it may be desired to provide a diaphragm and in place of the usual iris which is used in cameras, I propose to use a device as shown in Figures 10 and 11. At 92, I have provided an objective. Forward or rearward of this objective, and suitably carried by the camera housing are a pair of dove-tail guides 93 and 94. Within the dove-tail grooves of these guides are positioned correspondingly dove-tail slides 95 and 96. Each slide carries a laterally extending substantially rectangular member 97 and 98. Pins 99 and 100 are carried by the slides and the curved arm 101 is slotted inwardly at each end at 102 and 103, the pins being received therein. This arm is centrally pivoted to a portion of the camera housing. 104 is a knob which may be grasped by the fingers to rotate the arm 101. When this arm is rotated, the slides 95 and 96 are moved relative to the guides 93 and 94 to cause approach or separation of the members 97 and 98. These members are moved so that the transverse field of view of the lens is maintained but there is a cut-off relative to the top and bottom of the lens. This type of diaphragm has been found of use in the practice of the present invention.

The operation, uses and advantages of the invention are undoubtedly understood by those skilled in the art to which this invention appertains. However, with respect to certain other phases of the invention, I desire to point out that the invention in its several adaptations is capable of being used wherever an objective is required. I refer, for instance, to television; third dimensional and stereoscopic effects, and color photography in general.

In the case of color photography and television, the elimination of all 90° incident rays relative to the front lens surface permits greater accuracy of color registration at maximum apertures, with the result that adjustment of exposure to light strength is all that is required to obtain excellent color rendition with my invention.

In the case of that form of the invention shown for still cameras, to-wit, Figures 1 to 8, inclusive, the two light tunnels swing in an horizontal arc either relative to the objective or in unison therewith, each light tunnel being so related to the objective that it serves only one-half of the lens. At no time during the exposure swing can any image light from half of the lens pass through other than the tunnel designed to serve that half. The result of this method of exposure is to produce two exposures made in a progressive manner upon the same film panel. Each exposure has been made by its respective half of the lens and each half of the lens has functioned as a complete lens. Since these two halves do not occupy exactly the same position, we obviously have two exposures made from two different lens positions, the lens position difference being that distance from the center of one lens half to the center of the other lens half measured diametrically. The resultant image does not appear blurred on the film, although inasmuch as the field of image has been taken from two different positions, the registration of images on the film are microscopically different. When viewing prints made from a negative exposed in accordance with my invention, a third dimensional or stereoscopic result is produced. This is illustrated by Figure 13.

Assuming that the device of the present invention is installed in a camera housing, and the camera held horizontally, the light tunnel member would either lie beyond the position shown in Figure 5 so that no light beam passes through light tunnel 31, or at the excursion of its arc of movement on the opposite side, to cut off all light through light tunnel 32. Thus, the light tunnel member functions to cut off image bearing light rays from affecting the film except during an exposure period. It is not intended by the present invention that the light tunnel member should move clockwise, viewing Figure 5, and then swing anti-clockwise, viewing the same figure, for one exposure. It is intended that one clockwise swing should make one exposure and if the camera mechanism is properly arranged, a subsequent exposure may be made in an opposite direction, to-wit, the tunnel may swing anti-clockwise. That form of the invention which is adapted for motion picture purposes, and shown in Figures 14 to 18, inclusive, will move in one continuous direction per exposure. For instance, as previously set forth, the slots will be in a position to expose the film and during subsequent film movement, to again position a film panel, the solid portion of the discs will prevent light from entering the camera or other device via the lens.

The light tunnels are so constructed and arranged at the rear of the lens that all window capacity light is prevented from reaching the film. The only light that reaches the film is that light which passes through the two slots in the rear wall of the tunnel member. By varying the width of the slots so that the widest slot is that slot facing the objective, each light tunnel is sufficiently wide to permit the same to receive and transmit image bearing light rays from a half of the lens, and hence two progressive exposures will resut in the employment of the full lens capacity.

By moving the light tunnel axis to a proper position forward or backward along the line of the lens axis, there will be one position wherein the light tunnel will swing in its arc at a proper correlation to the lens prescription which will enable it to pass to the film only light rays with the refrangibility of the visible spectrum. Rays of greater or lesser refrangibility will be refracted into the partitions of the light tunnel membber and completely absorbed. In this manner, all ultra-violet light is dissipated and cannot become scattered light within the camera.

While my present invention is not to be considered as primarily based upon any scientific hypothesis, yet I have actually determined in practice that the average lens transmits within the camera, or other device, scattered light, and I have also found, as stated, that window capacity of the lens is very detrimental to the obtaining of fine photographic results.

Heretofore, I have mentioned the effect of increase of aperture or the size of the objective with relation to its focal length, and it was pointed out that if we increase the aperture or lens size, its window capacity is increased at a greater rate than the refracting capacity of the lens. Thus, the larger the aperture of the lens, the greater the fogging effect on the film, irrespective of the correctness of the exposure.

In the case of ultra-violet rays, I have found that such rays may be readily classed as window capacity fogging light. It is true that lens manufacturers have attempted to construct an optical glass of such composition as to absorb much of the ultra-violet light and to pass the blue end of the spectrum. However, it would appear at the present time quite impossible to absorb all ultra-violet light by any medium which will also pass the blue spectral rays in the needed and necessary quantities.

With my invention, it is possible to use a lens of larger diameter, and by the new method of exposure, as described, all image bearing light rays which reach the emulsion are those which are within definite maximum and minimum limits of refraction of the visible spectrum. Thus, I have provided by this invention, means whereby simplification of construction is effected because fewer corrections are necessary and substances having lower refractive indices than the present optical glass may be used.

I claim:

1. In a device of the character disclosed, a lens, a member provided with a pair of light tunnels through which refracted image bearing light is passed from the lens, said member provided with partitions adjacent the light tunnels, and adapted to confine the the image light refraction within the refrangible limits of the visible spectrum, and partitions bounding said light tunnels adapted to intercept and reject all light rays passed through said lens after striking the front surface thereof at an angle of 90° incident thereto.

2. In a device of the character disclosed, a single lens system, a member pivoted for movement on an axis normal to the optical axis of the lens system and positioned near the rear surface of the lens system, said member comprising two light tunnels leading from the rear surface of the lens system and diverging to two substantially rectangular terminal slots substantially parallel to each other and to the pivotal axis; said terminal slots lying adjacent the focal plane whereby the focal plane receives two images at two slightly different angles from two different positions of the lens system to give a stereoscopic image.

3. A device for substantially eliminating 90° incident light from the surfaces of a single lens system, comprising a single lens system and a member comprising two light tunnels mounted for pivotal movement on an axis normal to the optical axis of the lens system and positioned near the rear surface of the optical center of the lens system, the said member providing two separate images of an object produced from two different angles of said single lens system.

4. A device for reducing scattered light from lens surfaces, including a single lens system, means providing two separate images of an object produced from two different angles from said single lens system, said means comprising two light tunnels leading from the lens surface and diverging to two substantially rectangular terminal slots substantially parallel to each other, and pivotal means for said first means arranged adjacent the rear surface of the lens system, whereby the first means may be swung on an arc normal to the optical axis of the lens system.

5. A device for reducing scattered light from lens surfaces, including a single lens system, means providing two separate images of an object produced from two different angles from said single lens system, said means comprising two light tunnels leading from the lens surface and diverging to two substantially rectangular terminal slots substantially parallel to each other, pivotal means for said first means arranged adjacent the rear surface of the lens system, whereby the first means may be swung on an arc normal to the optical axis of the lens system, and said two light tunnels provided with partitions adapted to intercept all light rays passed through said lens system striking the front lens surface at an incident angle of 90°.

PAUL BURGESS.